(12) United States Patent
Kurisu et al.

(10) Patent No.: US 9,058,062 B2
(45) Date of Patent: Jun. 16, 2015

(54) SYSTEM AND METHOD FOR ACCESSING CONTENT

(75) Inventors: Yoshiomi Kurisu, Tokyo (JP); Hironao Ootsubo, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 450 days.

(21) Appl. No.: 12/767,347

(22) Filed: Apr. 26, 2010

(65) Prior Publication Data

US 2011/0263321 A1  Oct. 27, 2011

(51) Int. Cl.
*G06F 21/00* (2013.01)
*G06F 3/023* (2006.01)

(52) U.S. Cl.
CPC .............. *G06F 3/0238* (2013.01); *G06F 21/00* (2013.01); *A63F 2300/204* (2013.01); *A63F 2300/308* (2013.01)

(58) Field of Classification Search
CPC ....... G06F 21/12; G06F 21/62; G06F 21/629; A63F 2009/2407; A63F 2009/2439
See application file for complete search history.

(56) References Cited

U.S. PATENT DOCUMENTS

| | | | | |
|---|---|---|---|---|
| 4,336,935 A * | 6/1982 | Goldfarb | ........................ | 273/460 |
| 6,071,194 A * | 6/2000 | Sanderson et al. | .............. | 463/37 |
| 6,149,523 A * | 11/2000 | Yamada et al. | .................. | 463/31 |
| 6,313,121 B1 * | 11/2001 | Kung et al. | ................. | 514/237.5 |
| 6,494,830 B1 * | 12/2002 | Wessel | ........................... | 600/300 |
| 6,722,984 B1 * | 4/2004 | Sweeney et al. | .............. | 341/176 |
| 7,003,588 B1 * | 2/2006 | Takeda et al. | ..................... | 710/8 |
| 7,008,322 B1 * | 3/2006 | Suzuki et al. | ................... | 463/31 |
| 7,156,733 B2 * | 1/2007 | Chiang et al. | ..................... | 463/1 |
| 2002/0039922 A1 * | 4/2002 | Nelson | ............................. | 463/37 |
| 2002/0138754 A1 * | 9/2002 | Himeno | ........................ | 713/200 |
| 2002/0183119 A1 * | 12/2002 | Fessler | ............................. | 463/47 |
| 2003/0100375 A1 * | 5/2003 | Wakae et al. | ................... | 463/43 |
| 2003/0211891 A1 * | 11/2003 | Kikukawa et al. | .............. | 463/43 |
| 2004/0046800 A1 * | 3/2004 | Emerson | ....................... | 345/810 |
| 2004/0176170 A1 * | 9/2004 | Eck et al. | ......................... | 463/43 |
| 2004/0187061 A1 * | 9/2004 | Matsuda | ........................ | 714/746 |
| 2005/0272497 A1 * | 12/2005 | Sterchi et al. | ...................... | 463/3 |
| 2006/0009289 A1 * | 1/2006 | McCarten et al. | .............. | 463/42 |
| 2006/0084504 A1 * | 4/2006 | Chan et al. | ...................... | 463/39 |
| 2006/0121986 A1 * | 6/2006 | Pelkey et al. | ................... | 463/40 |
| 2006/0135137 A1 * | 6/2006 | Chung | ........................... | 455/415 |
| 2006/0148564 A1 * | 7/2006 | Herkelman | ...................... | 463/37 |
| 2007/0005450 A1 * | 1/2007 | Krishnamoorthy et al. | .... | 705/27 |
| 2007/0006275 A1 * | 1/2007 | Wright et al. | .................. | 725/133 |
| 2007/0021212 A1 * | 1/2007 | Liu et al. | ......................... | 463/40 |

(Continued)

FOREIGN PATENT DOCUMENTS

JP           9-321633        12/1997

OTHER PUBLICATIONS

"Nintendo GameCube", wikipedia.com, all pages, Dec. 27, 2008, http://web.archive.org/web/20081227100919/http://en.wikipedia.org/wiki/Nintendo_Gamecube.*

(Continued)

*Primary Examiner* — Calvin Cheung
(74) *Attorney, Agent, or Firm* — Nixon & Vanderhye PC

(57) ABSTRACT

Example systems and methods for facilitating access to stored content using a computer system comprising multiple non-alphanumeric buttons involve converting at least a portion of an identifier associated with the content to a code comprising a combination of one or more of the non-alphanumeric buttons. The code is stored along with access information for accessing the content and the access information is provided in response to receipt of the code.

24 Claims, 8 Drawing Sheets

(56) References Cited

U.S. PATENT DOCUMENTS

| | | | |
|---|---|---|---|
| 2007/0026945 A1* | 2/2007 | Nguyen | 463/42 |
| 2007/0072676 A1* | 3/2007 | Baluja | 463/42 |
| 2007/0111858 A1* | 5/2007 | Dugan | 482/8 |
| 2007/0184900 A1* | 8/2007 | Matsumoto et al. | 463/37 |
| 2007/0270206 A1* | 11/2007 | Snoddy et al. | 463/19 |
| 2008/0004115 A1* | 1/2008 | Chatani | 463/40 |
| 2008/0039205 A1* | 2/2008 | Ackley et al. | 463/40 |
| 2008/0070682 A1* | 3/2008 | Woody | 463/30 |
| 2008/0113809 A1* | 5/2008 | David et al. | 463/42 |
| 2008/0125226 A1* | 5/2008 | Emmerson | 463/42 |
| 2008/0154903 A1* | 6/2008 | Crowley et al. | 707/9 |
| 2008/0184360 A1* | 7/2008 | Kornilovsky et al. | 726/17 |
| 2008/0217075 A1* | 9/2008 | Gordner et al. | 178/18.01 |
| 2008/0261686 A1* | 10/2008 | Bedingfield | 463/29 |
| 2008/0303787 A1* | 12/2008 | Zheng | 345/156 |
| 2008/0305873 A1* | 12/2008 | Zheng | 463/37 |
| 2009/0037526 A1* | 2/2009 | Elliott et al. | 709/203 |
| 2009/0227373 A1* | 9/2009 | Yamamoto | 463/38 |
| 2009/0258700 A1* | 10/2009 | Bright et al. | 463/31 |
| 2011/0281652 A1* | 11/2011 | Laverdiere | 463/37 |
| 2012/0052954 A1* | 3/2012 | Zhu et al. | 463/42 |

OTHER PUBLICATIONS

"Nintendo GameCube accessories", wikipedia.com, all pages, May 13, 2008, http://web.archive.org/web/20080513042849/http://en.wikipedia.org/wiki/Nintendo_GameCube_accessories.*

"How to create a Username", WikiHow.com, all pages, Apr. 2, 2007, http://wayback.archive.org/web/20070401000000/http://www.wikihow.com/Create-a-Username.*

"Nintendo DS Lite", gdgt.com, all pages, retrieved Oct. 18, 2012.*

"Game-Boy-Advance-1stGet.png", Wikipedia, all pages, retreived Oct. 18, 2012.*

Judith Hoffman, "The Game Boy Camera", JudithHoffman.net, all pages, Apr. 22, 2009. http://web.archive.org/web/20090422072415/http://judithhoffman.net/tutorials/gameboycamera/htmlpages/gameboy.html.*

"Password Strength", Jan. 7, 2009, all pages. Retrieved from http://web.archive.org/web/20090107032501/http://en.wikipedia.org/wiki/Password_strength.*

"Xpadder: Use Your PC Gamepad Instead of Keyboard" all pages, published May 25, 2007, Retrieved from http://www.racketboy.com/retro/xpadder-use-your-pc-gamepad-instead-of-keyboard.*

* cited by examiner

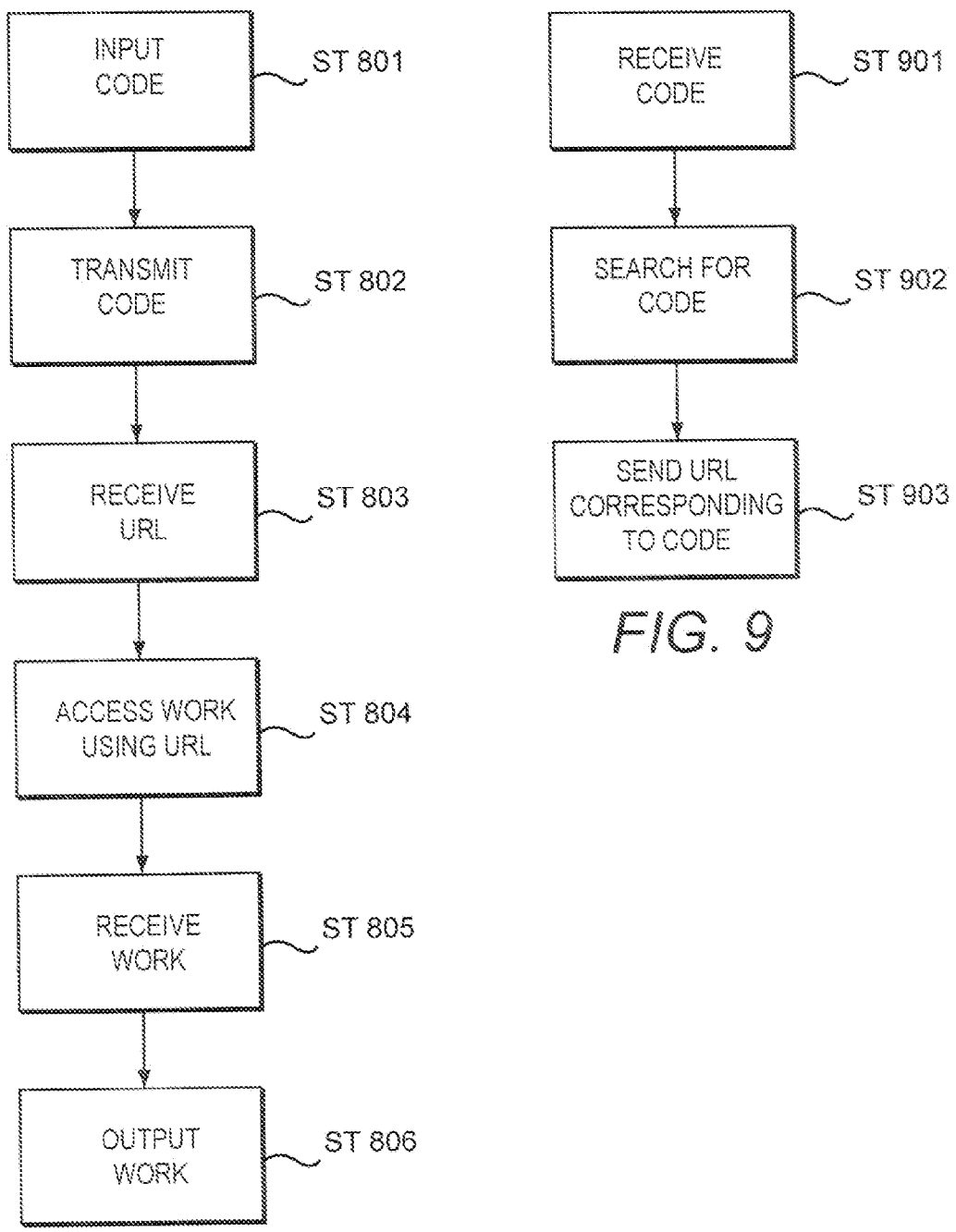

SYSTEM AND METHOD FOR ACCESSING CONTENT

This application generally relates to hand-held computer systems and, more particularly, to systems and methods for accessing content using hand-held computer systems such as hand-held video game systems.

BACKGROUND AND SUMMARY

Hand-held computer systems are in widespread use. One challenge with such systems is to provide a simple way to input information for the various tasks for which the computer system is used. Hand-held video game systems, for example, may include buttons and switches (e.g., a multi-directional cross-switch). While such input devices are quite intuitive and effective for playing games, they are less so for tasks such as inputting alphanumeric characters. Some systems have built-in keypads for such text entry, but this is often at the expense of screen size or the addition of a keypad which is slidable between an open and closed position. This latter arrangement may increase the size and weight of the system.

This application describes an example arrangement in which the non-alphanumeric buttons of a hand-held computer system are used to access content that is accessible by, for example, web addresses.

In one example, at least a portion of an identifier associated with content is converted to a code comprising a combination of one or more of the non-alphanumeric buttons of the computer system. The code is stored along with access information for accessing the content and the access information is provided in response to receipt of the code.

BRIEF DESCRIPTION OF THE DRAWINGS

FIG. 8 shows steps in an example method for retrieving content using the video game system of FIGS. 1-4;

FIG. 9 shows an example method for using a code received from the video game system of FIGS. 1-4 to retrieve access information for accessing content.

DETAILED DESCRIPTION OF EXAMPLE EMBODIMENTS

Figure 1:
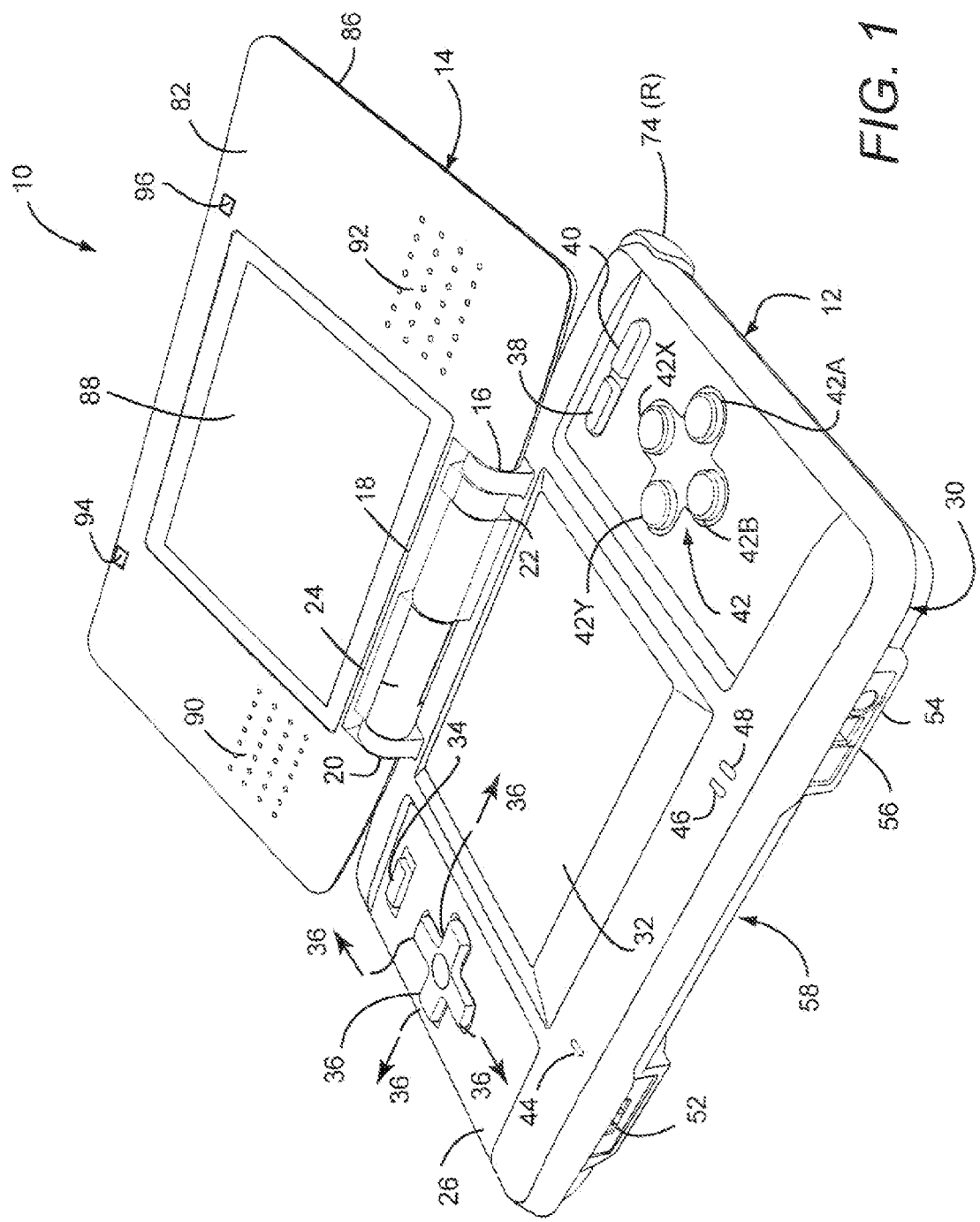
FIG. 1 is a perspective view of an example video game system, with the system shown in an open, ready-to-use orientation.
Figure 2:
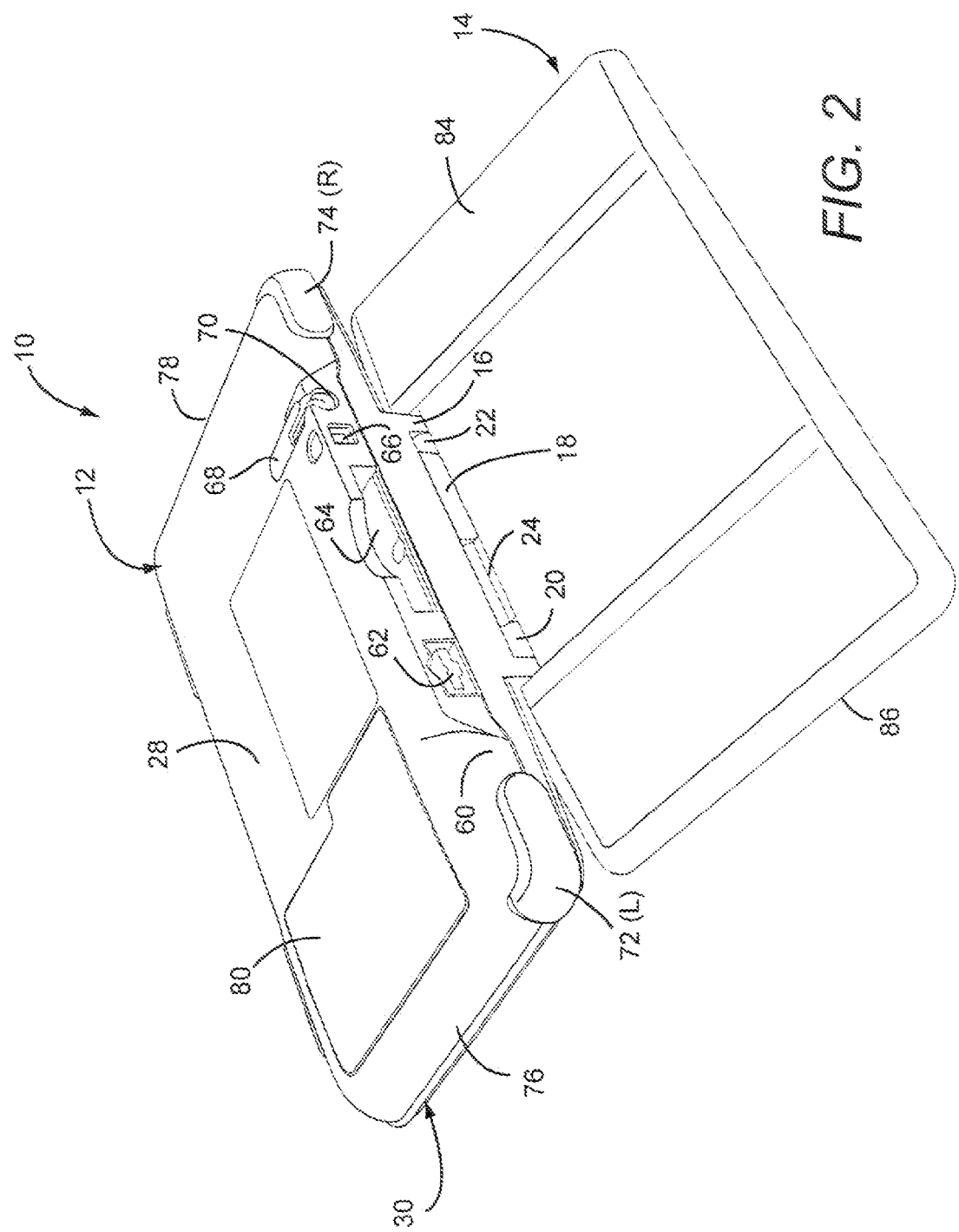
FIG. 2 is a inverted perspective view of the video game system shown in FIG. 1.

Referring to FIGS. 1 and 2, in an illustrative embodiment the game system or console 10 includes a main body 12 and a cover body 14 hingedly connected to each other along an upper edge of the main body 12 and a lower edge of the cover body 14 (references herein to terms such as "upper" and "lower" and "forward" and "rearward" are for ease of understanding and are made relative to an orientation of the game system where the cover body 14 is in an open position and the game is being held by a user in a normal operating position). Hinge elements 16, 18 and 20 on the main body 12 mesh with hinge elements 22 and 24 on the cover body, with a hinge pin (not shown) extending through the aligned hinge elements in conventional fashion. Note that because hinge elements 16, 18 and 20 extend from the upper (or inner) face 26 of the main body 12, the cover body 14 overlies the upper face 26 when the cover body 14 is closed over the main body. When the cover body 14 is in its fully open position, it is substantially parallel to the main body 12, but lies in a substantially parallel, offset plane. The main body 12 also has a lower (or outer) face 28 (FIG. 2) and a peripheral edge 30.

A first display screen 32 is recessed within the upper face 26 of the main body 12. The screen in the exemplary embodiment is a backlit, color liquid crystal display (LCD). This screen is touch sensitive and may be activated by a finger or stylus, as described further herein. A power button 34 is located in the upper left corner of face 26 and is used to turn the game on and off. A cross-shaped directional control button 36 is located adjacent and below the power button 34, and is used for game play control, for example.

In the upper right corner of the main body 12, there are side-by-side "start" and "select" buttons 38, 40, respectively, with X/Y/A/B buttons 42 (i.e., buttons 42X, 42Y, 42A and 42B) located adjacent and below the "start" and "select" buttons. Buttons 38, 40 and 42 are also used for game play control, for example. A microphone 44 is located below the left edge of screen 32 for use with specially designed games having a microphone feature. A battery recharge indicator LED 46 and a power indicator LED 48 are also located on the upper face 26, adjacent the lower edge thereof, below the right edge of screen 32.

Figure 3:
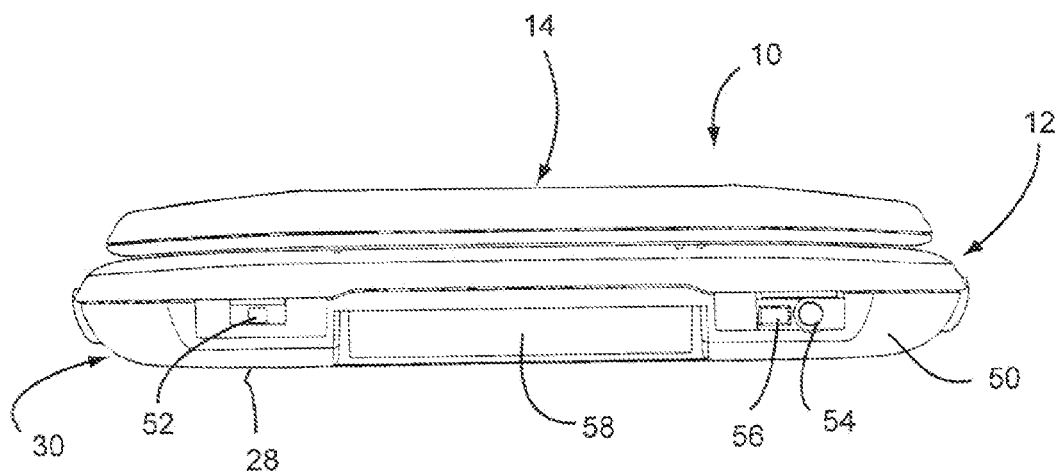
FIG. 3 is a front elevation of the video game system shown in FIG. 1, with the system shown in a closed position.
Figure 4:
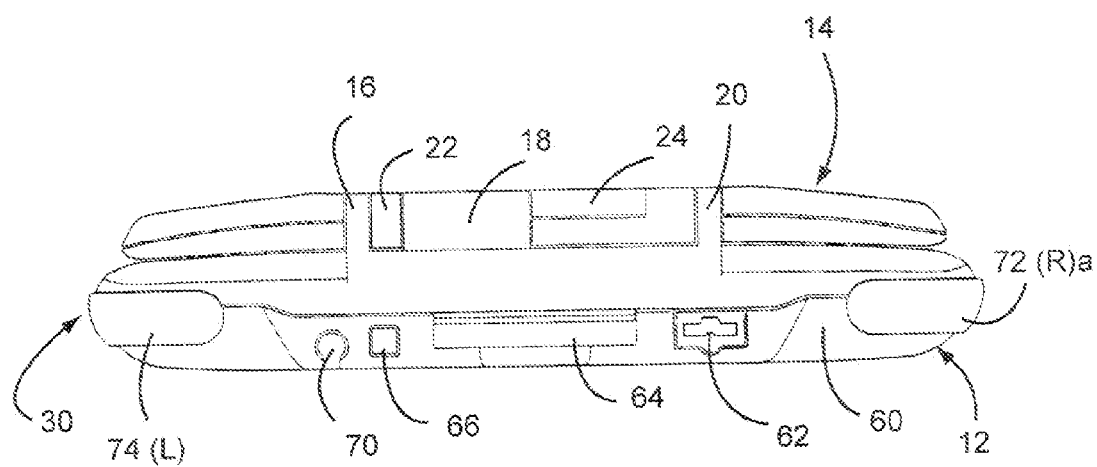
FIG. 4 is a rear elevation of the video game system shown in FIG. 3.

With reference now especially to FIG. 3, a lower or forward portion 50 of the peripheral edge 30 (closest to the user) is provided with a volume control slide 52 and headphone and microphone connectors 54, 56 on either side of a first slot 58. Slot 58 may receive memory cartridges such as game cards originally designed for use with the assignee's Game Boy Advance® game system. Although game system 10 is shown as including slot 58, this slot may be omitted or a slot of different size and type (e.g., for receiving secure digital (SD) memory cards) may be provided.

Figure 5:
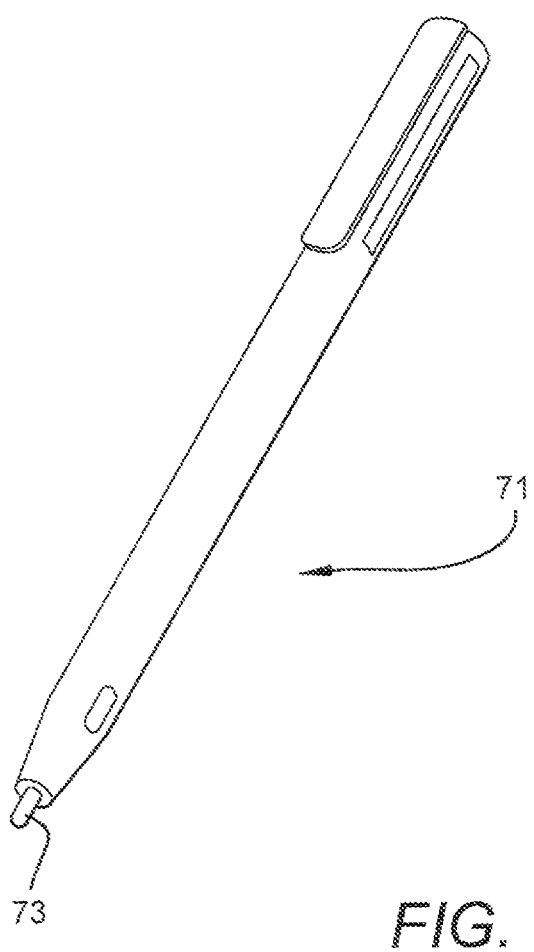
FIG. 5 shows a stylus usable with the video game system of FIGS. 1-4.

As best seen in FIG. 2, an upper or rearward portion 60 of the peripheral edge 30 is provided with an external extension connector 62 that permits connection to an AC adapter for recharging the internal battery (not shown), or for operating the game using household power. A second slot 64 in edge portion 60 is designed for receiving memory or game cards. The second slot 64 is smaller than the first slot 58, reflecting the different sizes of the cards received therein. Openings 66, 68 form an elbow-shaped through slot adapted for securing a wrist strap (not shown). A stylus port or holder, in the form of a blind bore 70 is located adjacent the wrist-strap mount for holding a stylus 71 (FIG. 5) before or after use.

The stylus 71 is a plastic pencil-shaped device with a rounded tip 73 and is used to activate the touch screen 32.

A pair of left, right control buttons (or shoulder buttons) 72L, 74R are located on the peripheral edge 30, at the corners where the upper portion 60 of the peripheral edge 30 meets the side portions 76, 78 of the peripheral edge. The location of these buttons and the location of previously described buttons 34, 36 and 42 facilitate manipulation by the user's thumbs and index fingers when the game is held with two hands in a natural and intuitive manner.

The lower (or outer) face 28 of the main body is provided with a battery cover 80 (FIG. 2) for accessing a rechargeable battery pack located within the main body.

The cover body 14 also has an upper (or inner) face 82 (FIG. 1) and a lower (or outer) face 84 (FIG. 2) connected by a peripheral edge 86. The upper face 60 incorporates a second display screen 88 of substantially the same dimensions as screen 32. Screen 88 is also a backlit color LCD. The cover body 14 also incorporates a pair of stereo speakers, with speaker grills 90, 92 located on opposite sides of the screen 88. Dimples or pads 94, 96 may be located above and laterally of screen 88. The dimples may be made of a compressible polymer or other suitable material and serve to dampen engagement of the inner surface 82 of the cover body 14 with the inner surface 26 of the main body 12 when the cover body is closed over the main body.

Figure 6:
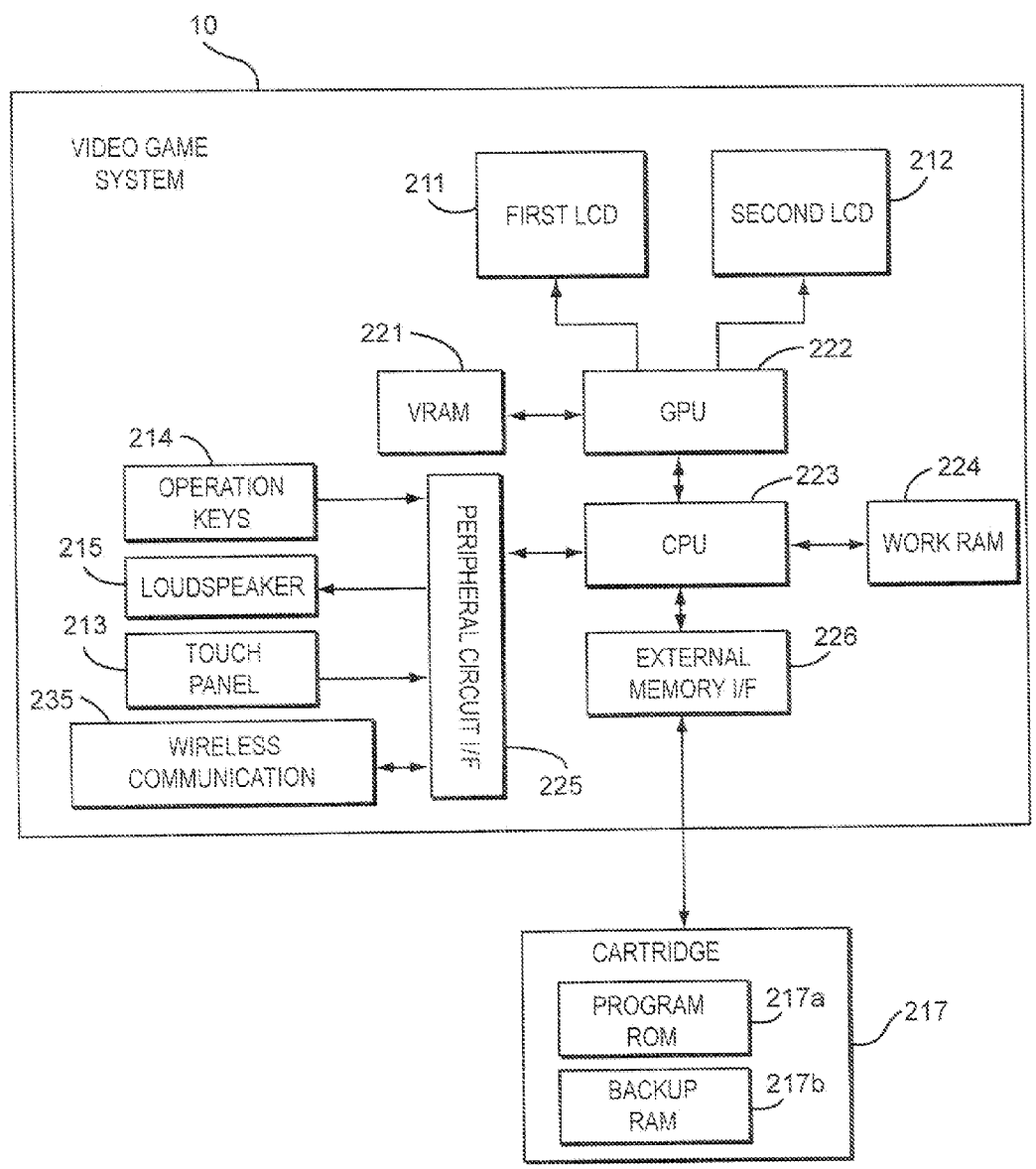
FIG. 6 is an illustration showing an internal configuration of the game system of FIGS. 1-4.

FIG. 6 is a block diagram showing internal components of video game system 10. As shown in FIG. 6, video game system 10 includes a CPU (central processing unit) 223, which is an example of a computer for executing a game program and other programs, and other components. CPU 223 includes a work RAM (working storage unit) 224, a GPU (graphic processing unit) 222, and a peripheral circuit I/F (interface) 225 that are electrically connected to one another. Work RAM 224 is a memory for temporarily storing, for example, a program to be executed by CPU 223 and calculation results of CPU 223. The GPU 222 uses, in response to an instruction from the CPU 223, a VRAM 221 to generate a game image for display output to a first LCD (liquid crystal display unit) 211 and a second LCD 212, and causes the generated game image to be displayed on the first display screen 211a of the first LCD 211 and the second display screen 212a of the second LCD 212. The peripheral circuit I/F 225 is a circuit for transmitting and receiving data between external input/output units, such as a touch panel 213, operation keys 214, loudspeaker 215 and a wireless communication circuit 235, and CPU 223. Touch panel 213 (including a device driver for the touch panel) outputs coordinate data corresponding to a position input (specified) with a stylus, for example. Wireless communication circuit 235 may conform to any conventional wireless protocols including, but not limited to, WiFi (e.g., 802.11, 802.11a, 802.11g and 802.11n), Bluetooth, Global System for Mobile Communications (GSM), and the like. Although only a single communication circuit is shown in FIG. 6, video game system 10 may in fact include multiple communication circuits, each conforming to a different wireless protocol.

Furthermore, the CPU 223 is electrically connected to the external memory I/F 226, in which the cartridge 217 is inserted. Cartridge 217 is a storage medium for storing the game program and, specifically, includes a program ROM 217a for storing the game program and a backup RAM 217b for rewritably storing backup data. The game program stored in program ROM 217a of cartridge 217 is loaded to the work RAM 224 and is then executed by CPU 223. In an exemplary case, a game program or other program is supplied from an external storage medium to the game system 10. However, the game program or other program may be stored in a non-volatile memory incorporated in advance in video game system 10, or may be supplied to video game system 10 via wireless communication circuit 235.

By way of example and without limitation, video game system 10 can run a variety of different programs or applications based upon a memory card inserted into slot 58 and/or slot 64, or programs or applications stored in on-board non-volatile memory. These programs are executed by CPU 223 and a user provides inputs using A button 42A, the B button 42B, the X button 42X, the Y button 42Y, the up button 36↑, the down button 36↓, the right button 36→, the left button 36←, the L button 72, and the R button 74. These inputs may be used to control movement of video game characters, make menu selections, use weapons and the like as is well-known.

Figure 10:
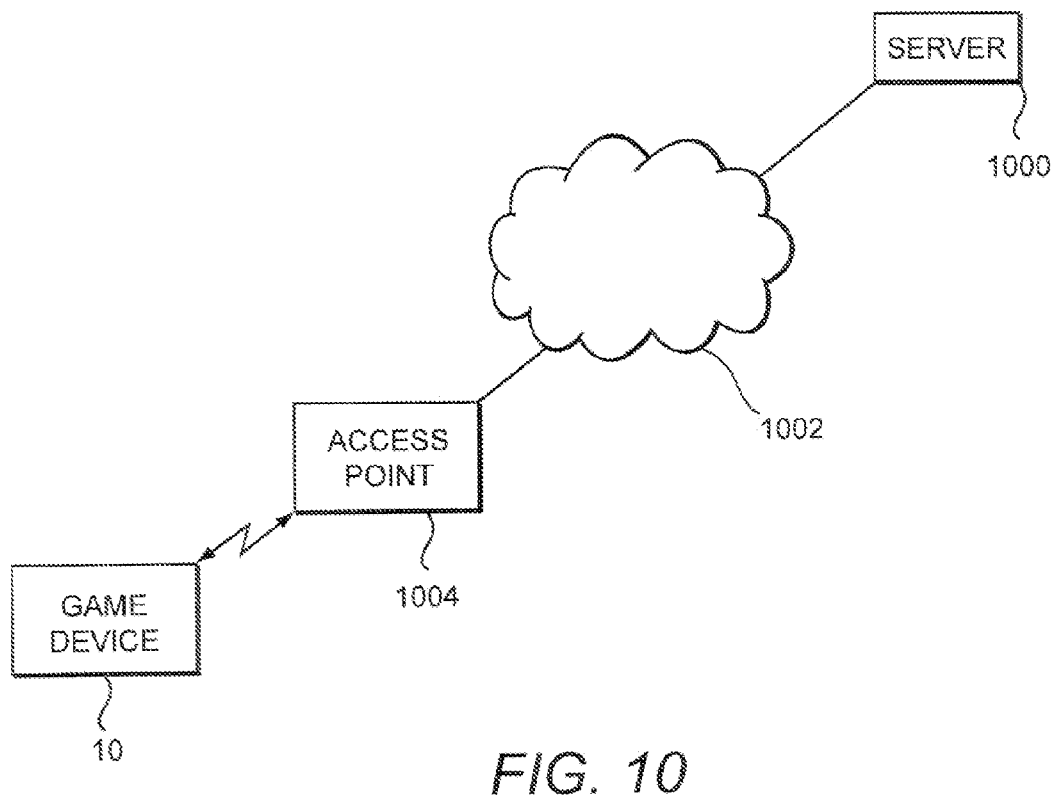
FIG. 10 shows a system view in which the video game system of FIGS. 1-4 communicates with a server over a network.

Video game system 10 is not limited to executing video games. For example, game system 10 may run program(s) or application(s) that allow users to create drawings or animations using touch screen 32. Sound effects may be added to the drawings or animations. Such program(s) may also provide the capability of uploading these drawings or animations to a server (such as server 1000 shown in FIG. 10) where they can be accessed by others, such as those on a friend or buddy list. For example, a server for storing such drawing or animation content may be accessible over the internet.

Other content including one or more of audio, video, graphics and combinations thereof may be created using video game system 10 and uploaded to a server for sharing with others. For example, if video game system 10 is configured with one or more cameras (not shown), a user could take pictures using the camera(s) and upload the pictures to share with family and friends. If the one or more cameras include a video camera, a user could take videos and upload these videos for sharing with family and friends. Similarly audio recordings can be created and uploaded for sharing with others. The systems and methods described herein are not limited to any particular type of content.

A user can connect to the server, for example, by using the wireless communication circuit 235 to connect to the internet 1002 via an access point 1004 (see FIG. 10) in the user's home or work place or in some public facility. Once connected to the server, the user can upload his/her own content and retrieve content uploaded by others.

The systems and methods described herein facilitate accessing such content. In particular, because video game system 10 does not include an alphanumeric keypad, the disclosed systems and methods allow content to be accessed using the non-alphanumeric buttons provided on the game system. As noted above, these buttons include A button 42A, the B button 42B, the X button 42X, the Y button 42Y, the up button 36↑, the down button 36↓, the right button 36→, the left button 36←, the L button 72L, and the R button 74R.

In this example, a search code for content is expressed as a series of inputs using the buttons of video game system 10. Specifically, the content search code is expressed as a combination of inputs using ten different buttons provided on game system 10, namely, the A button 42A, the B button 42B, the X button 42X, the Y button 42Y, the up button 36↑, the down button 36↓, the right button 36→, the left button 36←, the L button 72, and the R button 74.

In one example, the search code includes a combination of ten different button inputs which taken together indicate a channel, an author and a work. Specifically, the first through sixth button inputs identify a channel ($10^6$=1 million kinds of codes); the seventh and eighth button inputs identify an author ($10^7+10^8$=110 million kinds of codes); and the ninth and tenth button inputs identify a work ($10^9+10^{10}$=11 billion kinds of codes). Of course, the systems and methods described herein are not in any way limited to this particular arrangement of channels, authors and works.

The code is generated when a new set of a channel, an author and a work is recorded on server 1000 (see FIG. 10) as discussed in greater detail below.

Server 1000 can be implemented using any computer from a personal computer to a supercomputer that can be configured with any secondary and/or tertiary storage configurations including but not limited to a tape, disk, or SAN storage system. Network 1002 can support any of the many protocols known in the art including, but not limited to, IP. Network 1002 can be, but is not limited to, the Internet, a wide area network (WAN), a local area network (LAN), a cellular or ad hoc network, and can be implemented by way of example without limitation using cable, fiber, satellite, or wireless technology, and combinations thereof.

Figure 11:
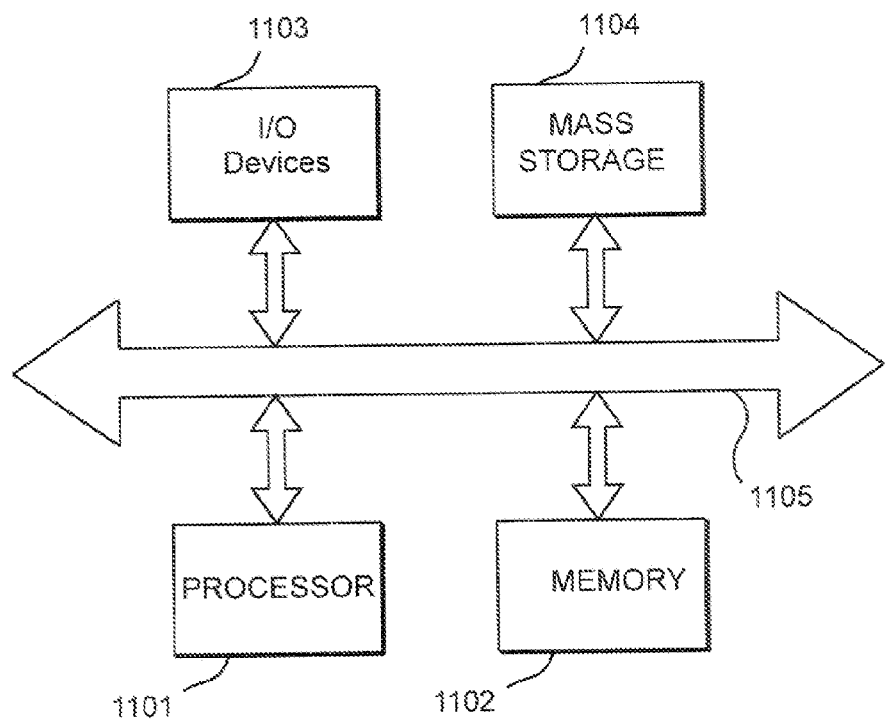
FIG. 11 is a generalized block diagram of server 1000.

With reference to FIG. 11, server 1000 includes a processor 1101, memory 1102, I/O devices 1103, and mass storage 1104 coupled to a system bus 1105. Processor 1101 may include one or more of a microprocessor, microcontroller, an arrangement of logic gates, a programmable logic array, an application specific integrated circuit and the like. Memory 1102 may be a combination of volatile and non-volatile memory used to store and load programs, for example. These programs may include, but are not limited to, a program (or programs) for storing uploaded content and providing access to the content as described below. I/O devices 1103 include, but are not limited to, displays, printers, speakers, keypads, keyboards, touch screens, mice, controllers, communications circuits, and the like. Mass storage 1104 includes hard disks, optical disks, semiconductor memories and the like. This mass storage may be used, for example, to store the above-mentioned content created by users so that it is accessible to others using the systems and methods described herein. Although not shown in FIG. 11, various controllers may be provided between the system bus and the components connected thereto (e.g., an I/O controller, a memory controller and the like).

Figure 7:
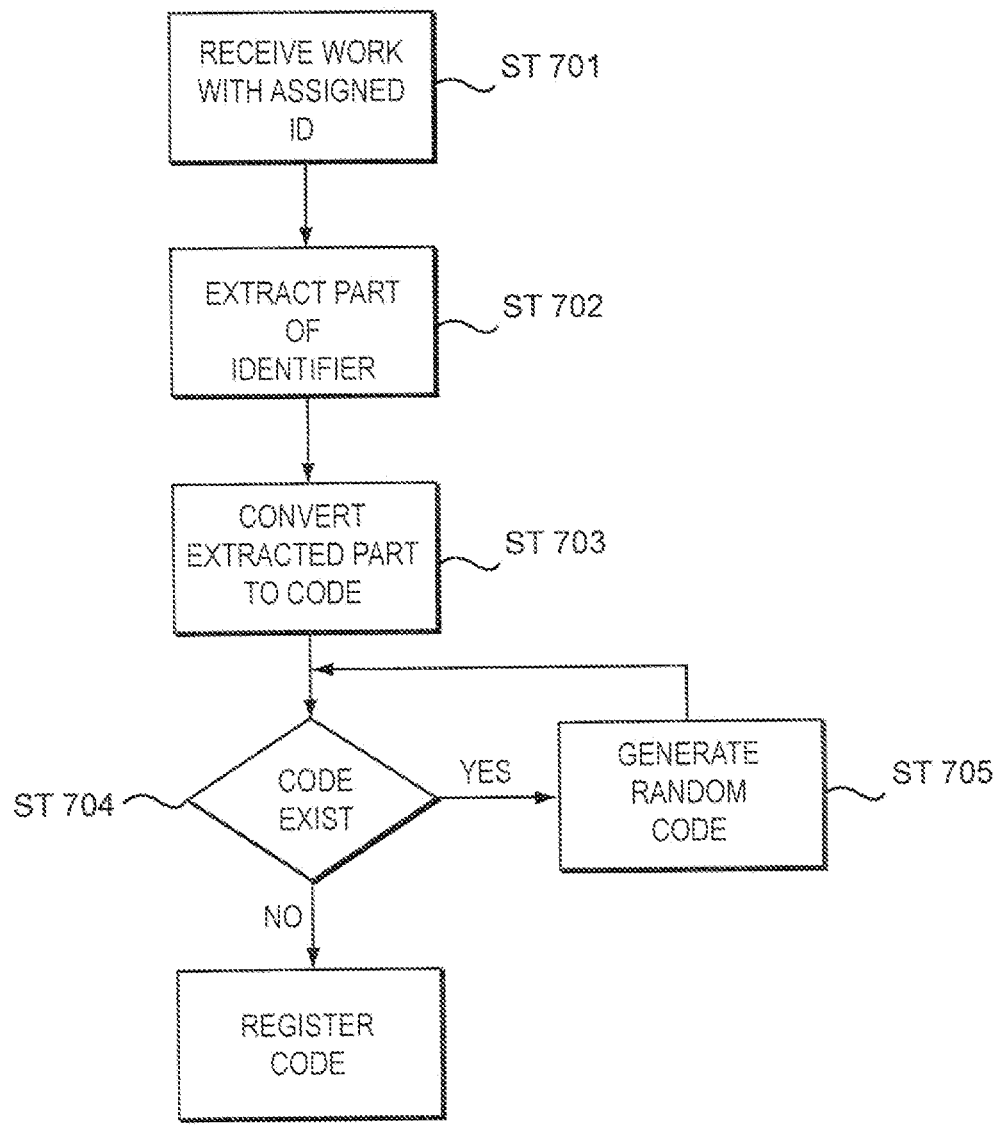
FIG. 7 shows steps in an example method of generating a code for accessing content using the video game system of FIGS. 1-4.

The method of generating a code that can be used to access content stored in server 1000 is described below with reference to FIG. 7.

At ST 701, content with a unique identifier is received at server 1000. In this example, the unique identifier is a 64-bit non-negative number, but identifiers of different lengths or types may be used. The identifier may be generated, for example, by video game system 10 (e.g., using a random number generator) when a user first saves the created content to the memory of the game system. The nature of the content is not limited and may be, for example, drawing(s), animations, images (e.g., photographs), video, sounds and the like created by a user of game system 10. The user is able to initiate communication with server 1000 over the internet 1002 by, for example, establishing a wireless connection with a local access point in the user's home, work place or public facility. For example, video game system 10 may include a communications application that is configured to establish a communication session with server 1000. The communications application may be, for example, a browser or any other type of communications application that is capable of accessing server 1000 in accordance with the HTTP protocol.

At ST 702, server 1000 extracts a portion of the unique identifier and the characters of the extracted portion are assigned to a new channel, a new author and a new work. For example, the server may extract the last 10 characters of the identifier.

At ST 703, the extracted portion is converted to a code in accordance with Table I below.

TABLE I

| | |
|---|---|
| "0" | A button |
| "1" | B button |

TABLE I-continued

| | |
|---|---|
| "2" | X button |
| "3" | Y button |
| "4" | Up button |
| "5" | Down button |
| "6" | Right button |
| "7" | Left button |
| "8" | L button |
| "9" | R button |

At ST 704, server 1000 checks whether the generated code already exists in the server. If so, server 1000 generates a code using a random number at ST 705 and the process returns to ST 704 to determine whether this newly generated code already exists on the server.

If the code does not already exist on server 1000, the server registers the code into a database maintained by the server at ST 706. In the database, the code may be associated with access information for accessing the content. For example, the access information may be a uniform resources locator that may be used to later retrieve the stored work. Thus, in this example, the database includes the content, the code corresponding to the content and access information for accessing the content. Of course, other information may also be stored in the database.

In an example implementation, the code may be communicated back to the video game machine and displayed on the display screen by symbols representing the various buttons. An example code may be:

$A\uparrow X\rightarrow\uparrow Y\downarrow L\leftarrow R$ where A represents the A button, ↑ represents the up button, → represents the right button, Y represents the Y button, ↓ represents the down button, L represents the L button, ← represents the left button and R represents the R button. The user may save the code in memory of the video game system for later selection to access the corresponding content. Other information such as time, date, and the like may also be saved. The memory may store multiple codes corresponding to multiple content and particular content may be accessed by selecting one of the codes, e.g., from a memory. Of course, the content may also be accessed by selecting the different buttons corresponding to the content desired to be accessed.

An example process for retrieving stored content using video game system 10 is explained with reference to FIG. 8. At ST 801, video game system 10 receives an input code (input, e.g., by a user) which is some combination of one or more of the A button 42A, the B button 42B, the X button 42X, the Y button 42Y, the up button 36↑, the down button 36↓, the right button 36→, the left button 36←, the L button 72, and the R button 74. In some implementations, video game system 10 may be supplied with an input for selecting one input code from among a menu of displayed input codes. The code is then sent from the video game system 10 to server 1000 over the internet (ST 802). In particular, video game system 10 sends data indicative of the combination of buttons pressed by the user or corresponding to a selected one of multiple displayed button combinations.

At ST 803, video game system 10 receives from server 1000 access information corresponding to the code and, at ST 804, video game system 10 uses the access information to access the content corresponding to the input code. As noted above, the access information may comprise a URL. This operation may take place with or without user intervention. That is, the access information may be received and used to access the content without the user being aware that these communications are taking place. Alternatively, the user may be required to provide some input after the access information is received and before it is used to access the content. In other instances, server 1000 may retrieve the content and supply it to the video game system.

At ST 805, video game system 10 receives the content and, at ST 806, the video game system outputs the content (e.g., using one or both of displays 211, 212 and/or the stereo speakers).

An example process for using a code received from video game system 10 to retrieve corresponding access information is described with reference to FIG. 9.

At ST 901, server 1000 receives the code sent from game system 10. The server uses the code to search its database at ST 902 to locate the corresponding access information. At ST 903, the server transmits the located access information to game system 10. It will be appreciated that the access information (e.g., URL) is not limited to pointing to content on server 1000 and may in fact point to content stored on other servers.

In the example above, code generation is performed by server 1000. However, such generation may alternatively be performed by video game system 10. In this case, video game system 10 would check the database on server 1000 to determine whether the locally generated code already exists on the remote database.

The system may be configured to provide a number of additional features.

For example, video game system 10 may access all the content on a particular channel in response to a combination of button inputs corresponding to a channel (e.g., some combination of six button inputs). In response to receiving the channel information, server 1000 may return a listing of the content on that channel from which selections of particular content may be made (e.g., either by menu selections or by button inputs).

Video game system 10 may access all the content on a particular channel by a particular author in response to a combination of button inputs corresponding to a channel and an author (e.g., some combination of six button inputs for the channel and two button inputs for the author).

As explained above, video game system 10 may access a particular work in response to a combination of button inputs corresponding to a channel, an author and a work (e.g., some combination of six button input for the channel, two button inputs for the author and two button inputs for the work).

Channels may be based on the category of the work. For example, separate channels may be provided for photographs, videos, drawings, animations, etc. The channels may be further refined so that there are channels for particular types of photographs, videos, drawings, animations, etc. (e.g., nature photographs, funny photographs, and the like). The channel structure may be defined on the server 1000, for example. In such an example implementation, video game machine 10 may access the server to display a list of channels from which a channel selection may be made. Uploaded content may then be associated with the selected channel. In some implementations, the content-creator may define his/her own channel(s), which are then registered on server 1000.

In another example implementation, an author may be assigned a particular code (e.g., by the server 1000) and this code may be associated with all content uploaded by that author. In this example, the work code for content by a particular author on a particular channel may be automatically incremented by the server as the author uploads new content to that channel (e.g., the author's first work on the channel is work 01, the second 02, etc.).

Server 1000 may also be configured to provide notifications to others when an author uploads content to the server. For example, if a user maintains a friend or buddy list on server 1000 (or some other server in communication with server 1000), the friends or buddies on the list may be notified when the user uploads content. This notification may be provided the next time the friend or buddy logs into server 1000. The notification may include the code (or codes) for the content uploaded by the user. The friend or buddy may access the content by selecting the code(s). Alternatively or additionally, the notification may be provided by an alternate communication mode (e.g., e-mail or instant message) to some other communication device of the friend or buddy if the server stores appropriate contact information (e.g., e-mail address, telephone number, etc.) for the friend or buddy.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a non-transitory machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

While this application describes certain examples, it is to be understood that the systems and methods described herein are not limited to these examples, but on the contrary, and are intended to encompass various modifications and equivalent arrangements included within the spirit and scope of the appended claims.

What is claimed is:

1. A method for facilitating access to stored content using an information processing system comprising multiple physical buttons including one or more non-alphanumeric buttons, the method comprising using a programmed computer system to perform operations including:

converting a combination of alphanumeric elements of an alphanumeric identifier associated with the stored content to a code comprising a sequence of the non-alphanumeric buttons of the information processing system, wherein the converting is performed with reference to conversion information defining correspondence between alphanumeric elements of the alphanumeric identifier and the non-alphanumeric physical buttons of the information processing system, wherein the alphanumeric identifier is generated using a random number generator when the stored content is saved;

storing the code along with access information for accessing the stored content;

communicating the code to the information processing system; and providing the access information to the information processing system in response to receipt of the code from the information processing system.

2. The method according to claim 1, wherein the converting converts a number of characters at the end of the alphanumeric identifier to the code.

3. The method according to claim 2, wherein the number of characters is at least ten.

4. The method according to claim 1, wherein the non-alphanumeric buttons include one or more portions of a cross-switch of the information processing system.

5. The method according to claim 1, wherein the information processing system is embodied as a hand-held video game system.

6. The method according to claim 1, wherein the access information comprises a uniform resource locator.

7. The method according to claim 1, wherein the access information comprises information for accessing information about an author of the stored content.

8. The method according to claim 1, wherein the access information comprises information for accessing information about a category containing the stored content.

9. The method according to claim 1, wherein each non-alphanumeric button of the information processing system corresponds to one of the alphanumeric elements.

10. The method according to claim 1, wherein each non-alphanumeric button of the information processing system corresponds to a numeral.

11. The method according to claim 1, further comprising receiving and outputting the stored content on a display of the information processing system in response a request comprising the access information.

12. The method according to claim 1, wherein the alphanumeric identifier includes only numbers.

13. A non-transitory computer-readable storage medium storing program instructions, which when executed, cause a computer to perform operations for facilitating access to stored content using an information processing system comprising multiple physical buttons including one or more non-alphanumeric buttons, the operations comprising:

converting a combination of alphanumeric elements of an alphanumeric identifier associated with the stored content to a code comprising a sequence of the non-alphanumeric buttons of the information processing system, wherein the converting is performed with reference to conversion information defining correspondence between alphanumeric elements of the alphanumeric identifier and the non-alphanumeric physical buttons of the information processing system, wherein the alphanumeric identifier is generated using a random number generator when the stored content is saved;

storing the code along with access information for accessing the stored content;

communicating the code to the information processing system; and providing the access information to the information processing system in response to receipt of the code from the information processing system.

14. The non-transitory computer-readable storage medium according to claim 13, wherein the converting converts a number of characters at the end of the alphanumeric identifier to the code.

15. The non-transitory computer-readable storage medium according to claim 13, wherein the number of characters comprises ten.

16. The non-transitory computer-readable storage medium according to claim 13, wherein the access information comprises a uniform resource locator.

17. The non-transitory computer-readable storage medium according to claim 13, wherein the access information comprises information for accessing the information about an author of the stored content.

18. The non-transitory computer-readable storage medium according to claim 13, wherein the access information comprises information for accessing the information about a category containing the stored content.

19. A hand-held information processing system comprising:

a display screen;

an arrangement of one or more buttons including one or more non-alphanumeric buttons;

a processing system configured to
receive inputs supplied by actuating a sequence of buttons including at least one non-alphanumeric button,
transmitting a code comprising the sequence of buttons to a server,
receiving from the server access information for accessing content corresponding to the transmitted code, and,
in response to receipt of access information, using the access information to access and output the content,
wherein each non-alphanumeric physical button corresponds to a respective alphanumeric element of an alphanumeric identifier associated with the content,
wherein the alphanumeric identifier is generated using a random number generator when the content is saved.

20. The hand-held information processing system according to claim 19, wherein the access information comprises a uniform resource locator.

21. The hand-held information processing system according to claim 19, further comprising:
a camera.

22. The hand-held information processing system of claim 19, wherein the hand-held information processing system is embodied as a hand-held game system.

23. A system for facilitating access to stored content by an information processing system comprising multiple physical buttons including one or more non-alphanumeric buttons,
the system comprising:
memory; and
one or more processors configured to execute instructions stored in the memory to perform operations comprising:
converting a combination of alphanumeric elements of an alphanumeric identifier associated with the stored content to a code comprising a sequence of the non-alphanumeric buttons of the information processing system,
wherein the converting is performed with reference to conversion information defining correspondence between alphanumeric elements of the alphanumeric identifier and the non-alphanumeric physical buttons of the information processing system,
wherein the alphanumeric identifier is generated using a random number generator when the stored content is saved;
storing the code along with access information for accessing the stored content;
communicating the code to the information processing system; and
providing the access information to the information processing system in response to receipt of the code from the information processing system.

24. The system according to claim 23, implemented as a server on a network.

* * * * *